US006428008B1

(12) United States Patent
Singer

(10) Patent No.: US 6,428,008 B1
(45) Date of Patent: *Aug. 6, 2002

(54) ARCADE GAME ASSEMBLY

(76) Inventor: Craig B. Singer, 4534 Old Denton Rd., Carrollton, TX (US) 75008

(*) Notice: Subject to any disclaimer, the term of this patent is extended or adjusted under 35 U.S.C. 154(b) by 0 days.

This patent is subject to a terminal disclaimer.

(21) Appl. No.: 09/553,878

(22) Filed: Apr. 20, 2000

Related U.S. Application Data

(63) Continuation-in-part of application No. 29/117,528, filed on Jan. 25, 2000, now Pat. No. Des. 434,085.

(51) Int. Cl.[7] .................................................. A63F 7/36
(52) U.S. Cl. .................... 273/447; 312/114; 312/223.1; D21/325
(58) Field of Search ................................ 273/447, 448, 273/454, 455, 456, 459, 460; 206/335; 312/114, 223.1; D21/324, 325, 326, 327, 328, 333, 534

(56) References Cited

U.S. PATENT DOCUMENTS

| D96,564 S | * | 8/1935 | Simpkins .................. D21/325 |
|---|---|---|---|
| D195,029 S | | 4/1963 | Hotkins et al. |
| D195,680 S | | 7/1963 | Braun et al. |
| 4,527,980 A | | 7/1985 | Miller |
| 4,695,903 A | | 9/1987 | Serap et al. |
| 4,710,129 A | | 12/1987 | Newman et al. |
| 4,960,117 A | | 10/1990 | Moncrief et al. |
| 5,271,628 A | | 12/1993 | Okada |
| D360,901 S | | 8/1995 | Slater |
| 5,511,794 A | * | 4/1996 | Katamoto .................. 273/440 |
| 5,533,935 A | | 7/1996 | Kast |
| 5,549,372 A | | 8/1996 | Lewis |
| 5,558,340 A | * | 9/1996 | Ibe et al. .................. 273/448 |
| D380,779 S | | 7/1997 | Shinzato |
| 5,674,127 A | | 10/1997 | Horstmann et al. |
| 5,711,530 A | | 1/1998 | Lewis |
| 5,772,513 A | | 6/1998 | Ohishi |
| D396,898 S | | 8/1998 | Tsuda |
| 5,846,164 A | | 12/1998 | Latypov |
| D429,768 S | * | 8/2000 | Smart ....................... D21/325 |
| D434,085 S | * | 11/2000 | Singer ...................... D21/325 |

OTHER PUBLICATIONS

"Designs for New Millennium", Shopping Center World, Jul., 1999, pp. 43–46, 48.

* cited by examiner

*Primary Examiner*—Raleigh W. Chiu
(74) *Attorney, Agent, or Firm*—Vedder, Price, Kaufman & Kammholz

(57) ABSTRACT

An arcade game assembly with various arcade games including a large housing having an exterior configuration resembling a vehicle. The interior portion includes a plurality of separate receptacles which each receive a portion of at least one arcade game. Each game unit has side panels with a transparent portion in each. The housing also has at least one transparent panel on the exterior surface. A plurality of panels further define the interior, and at least one of the panels has an aperture. The configuration of the present invention permits a longitudinal and lateral line-of-sight to pass completely unimpaired through the assembly to increase the visibility of the prizes and of the viewers and players.

26 Claims, 5 Drawing Sheets

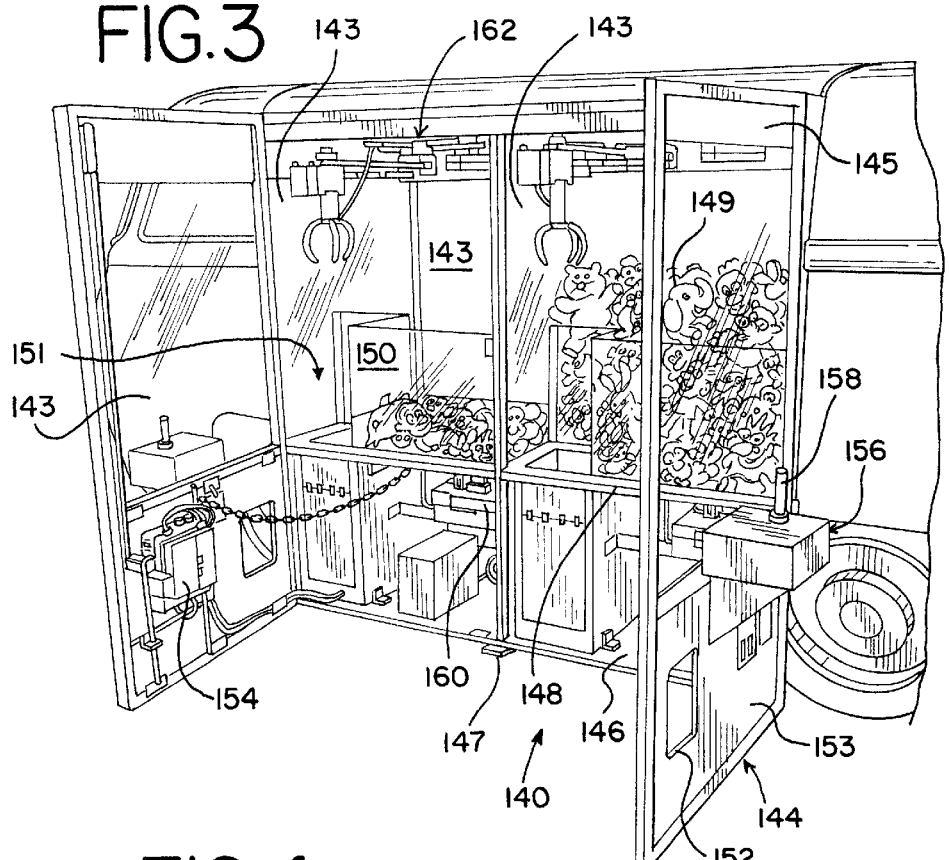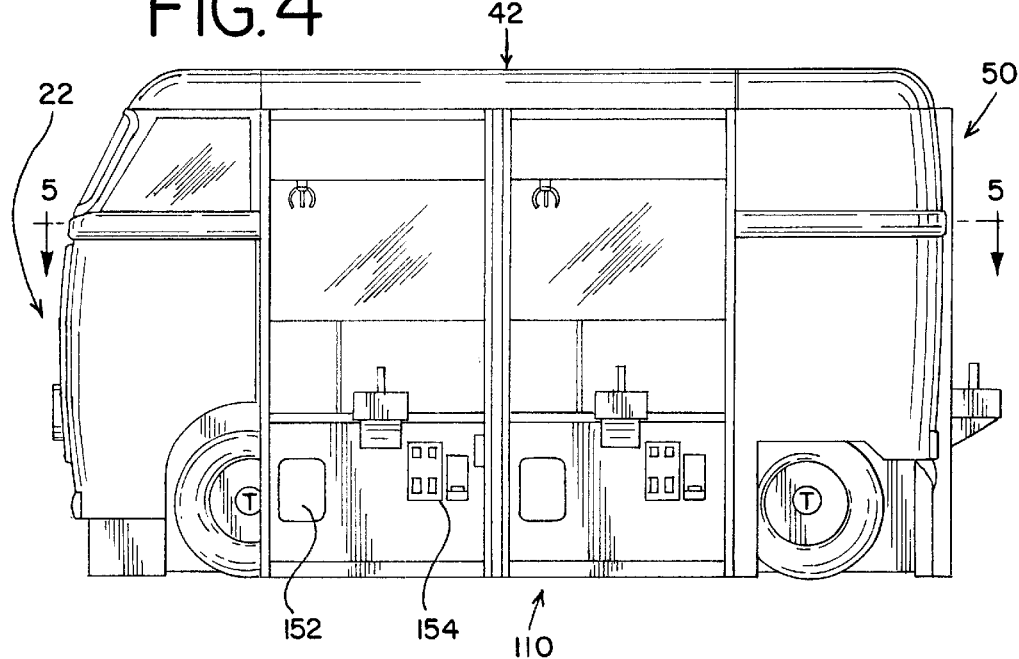

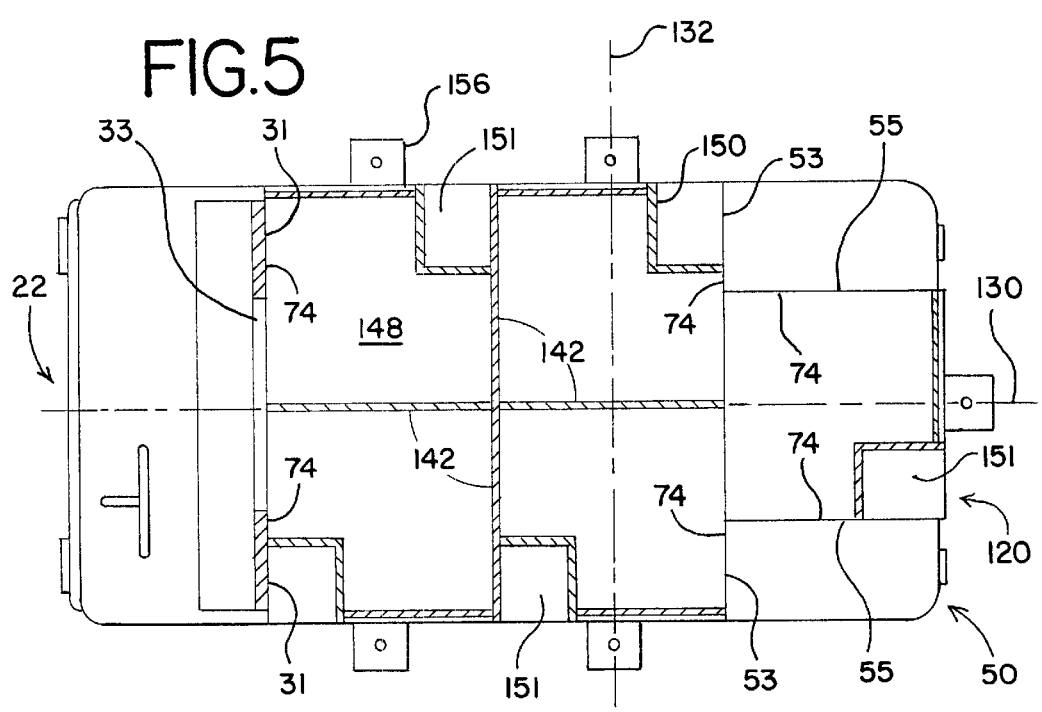
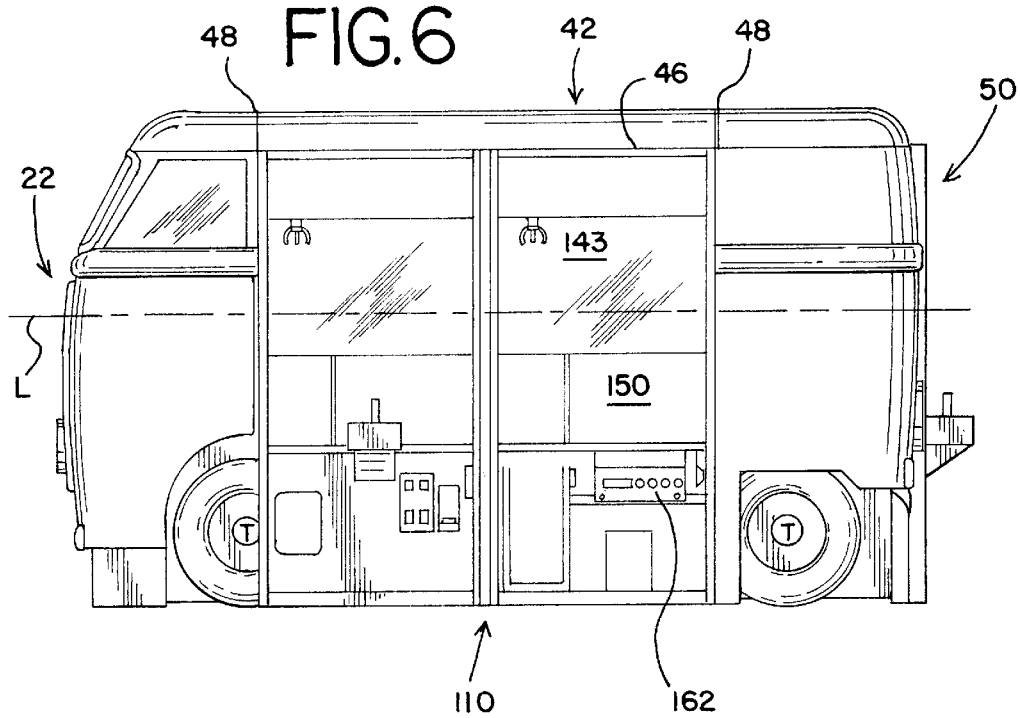

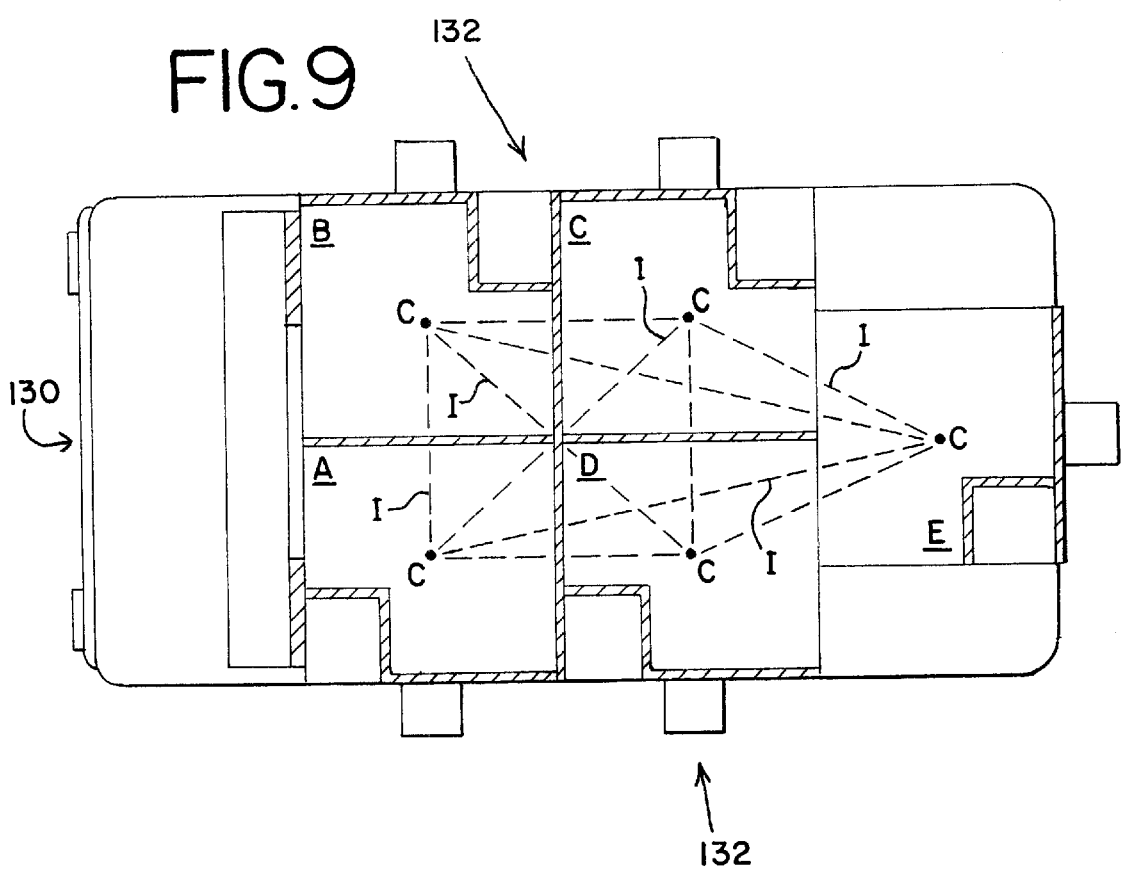

ARCADE GAME ASSEMBLY

This is a continuation-in-part of application Ser. No. 29/117,528 filed Jan. 25, 2000 now U.S. Pat. Des. No. 434,085.

BACKGROUND OF THE INVENTION

The present invention relates generally to arcade games, and more particularly to a housing for multiple arcade-style games in which the visibility of the gaming action of the spectators and operators is increased, encouraging greater participation and revenue generation.

Historically, video or skill manipulation arcade-style games were designed and constructed with the primary emphasis focused on the game operator. The line-of-sight, control console and feedback were very restrictive and directed. In reality, only the operator could reasonably view what transpired during the game. Traditionally, the housings for these games were solitary units, and were constructed primarily of flat panels with painted graphics as the sole identifying characteristic of the game. Often times the side panels were not contoured to permit advantageous viewing angles for spectators from the sides. A different group of arcade-style games were designed to position an operator inside a relatively enclosed space to enhance the game experience. Some of these enclosures were of a cubicle style, while more recent ones resembled the vehicle portrayed in the game. There are many disadvantages of these prior art types of multiplayer games, including size limitations, complexity of design, ability to engage the interaction of numerous operators simultaneously, inability of spectators to observe and cost of construction and operation. Nearly all multiplayer games are incredibly large, unwieldy, expensive to manufacture and linearly arranged. This type of arrangement makes observation of another operator's game difficult. The design of these multiplayer games becomes more complex the larger they become. Clear lines-of-sight for spectators, passers-by or other operators are difficult to achieve with the linear or enclosed design.

The present invention overcomes the disadvantages of the prior art by providing a game housing with multiple games disposed therein and operators positioned externally. Transparent panels and reflective portions enable the games to be openly viewed by players, spectators and passers-by. Marketing studies indicate that increased revenue can be generated from arcade-style games if the games are designed to encourage a greater number of spectators to observe than players. The present invention accomplishes this with a unique housing and game configuration. The challenge to do better or score higher becomes more relevant when the spectators can view the gaming action. Additionally, the simultaneous operation by a number of players who can easily view one another's actions also encourages competition in contrast to other games which are configured linearly which makes it difficult for operators to view one another's performance. Furthermore, the linear relationship requires a significant amount of space.

Alternatively, the present invention houses a plurality of games in the space required for an enclosed single player game, while providing the added benefit of permitting all of the players to see each other and encouraging spectator participation through increased visibility. Furthermore, since the game players are positioned about the perimeter of the housing, and a large number of games may be disposed therein, the costs of operation per square foot of floor space are dramatically reduced due to the increased revenue per game housing. Placement of the present invention may also be introduced into previously unconventional or unavailable locations, namely mall walkways.

SUMMARY OF THE INVENTION

Accordingly, it is a general object of the present invention to provide arcade game assembly which permits increased visibility or visual access for spectators and players alike, in order to generate more interest in the gaming thereby inspiring more competition and generating more revenue.

Another object of the present invention is to provide distinguishing features on the exterior of the housing that persons will recognize as a certain type of vehicle, which generates more interest in the games positioned therein, drawing new and additional players to the various game consoles.

A further object of the present invention is to provide an arcade game assembly of modular construction having a plurality of interchangeable game units, thus permitting the owner the option of rotating different games in and out of the assembly depending on the popularity and revenue performance of the games.

It is a further object of the present invention to provide longitudinal and lateral lines-of-sight which pass through the arcade game assembly unimpaired as a result of a plurality of transparent panels and reflective portions.

In order to obtain the aforementioned objects, one principal aspect of the invention that is exemplified by one embodiment thereof includes a pair of end sections spaced apart and joined to one another by an interconnecting portion that defines an opening that accommodates at least two different receptacles for receiving game units. Additionally, another receptacle is defined in one of the end sections which is proximate, adjacent and contiguous to the other receptacles. The visibility of the prizes and game action for spectators and game operators is greatly increased by the adjacent configuration of all the receptacles and game units.

In another principal aspect of the present invention, distinguishing features are provided on the exterior of the housing end sections to entice spectator interest, increase participation, and to readily identify the housing as a particular type of vehicle. The features often include headlights, taillights, insignia, windshield, trim, bumpers, door windows, body lines, wheels and tires, but are not limited thereto.

In a further principal aspect of the present invention, the receptacles are further defined by a plurality of interior panels having a reflective portion and an aperture. A longitudinal line-of-sight passes directly through the housing along the longitudinal axis unimpaired.

In a still further principal aspect of the present invention, one receptacle is defined in a vehicle rear section.

In still another principal aspect of the present invention, and as exemplified by another embodiment thereof, the housing has four distinct faces including a front face having distinguishing features identifiable as a vehicle. Additionally, at least one receptacle, for receiving an arcade game, is defined within each of the other three faces by a plurality of panels within the housing. Furthermore, at least one of the panels has a reflective portion which greatly increases the visibility of prizes and game action for the spectators and players alike.

In still another principal aspect of the present invention and as exemplified by another embodiment thereof, an arcade game assembly includes a housing with an exterior which represents a vehicle body, and an interior which defines a plurality of separate receptacles in the housing for receiving game units, with one arcade game unit being located in each receptacle and having a plurality of side panels, each of which is transparent. Additionally, the housing has a plurality of exterior transparent panels through which spectators may observe the gaming action. The interior is defined by a plurality of panels with one having an aperture therein. This aperture and the transparent panels located on the game units and housing exterior provide longitudinal and lateral lines-of-sight which pass completely unimpaired through the assembly, thereby greatly increasing the visibility of the prizes and gaming action for the spectators and game players alike.

These and other objects, features and advantages of the present invention will be clearly understood through consideration of the following detailed description.

BRIEF DESCRIPTION OF THE DRAWINGS

In the course of the following detailed description, reference will be made to the accompanying drawings wherein like reference numerals identify like parts and in which:

FIG. 3 is an enlarged side view of the housing and assembly of FIG. 1 with the game unit doors opened;

FIG. 4 is a side plan view of the housing and assembly of FIG. 1;

FIG. 5 is a cross-sectional view of the housing and assembly of FIG. 1 taken along line 5—5 in FIG. 4;

FIG. 6 is a side elevational view of the housing and assembly of FIG. 1 with the door to one game unit opened;

FIG. 9 is a cross-sectional schematic view of the housing illustrating the position and number of receptacles of the assembly that receive game units.

DETAILED DESCRIPTION OF THE PREFERRED EMBODIMENTS

The present invention is directed to an improved arcade game assembly particularly useful for containing a large number of games in a relatively small space, attracting more participants to the games, generating more revenue and conserving footprint size in space restricted locations. More specifically, the present invention positions game units adjacent to each other about the exterior of the housing and uses a plurality of transparent panels on the games to greatly increase the visibility of games to spectators and players, thereby attracting the attention of potential players, and encouraging participation and competition.

Figure 1:
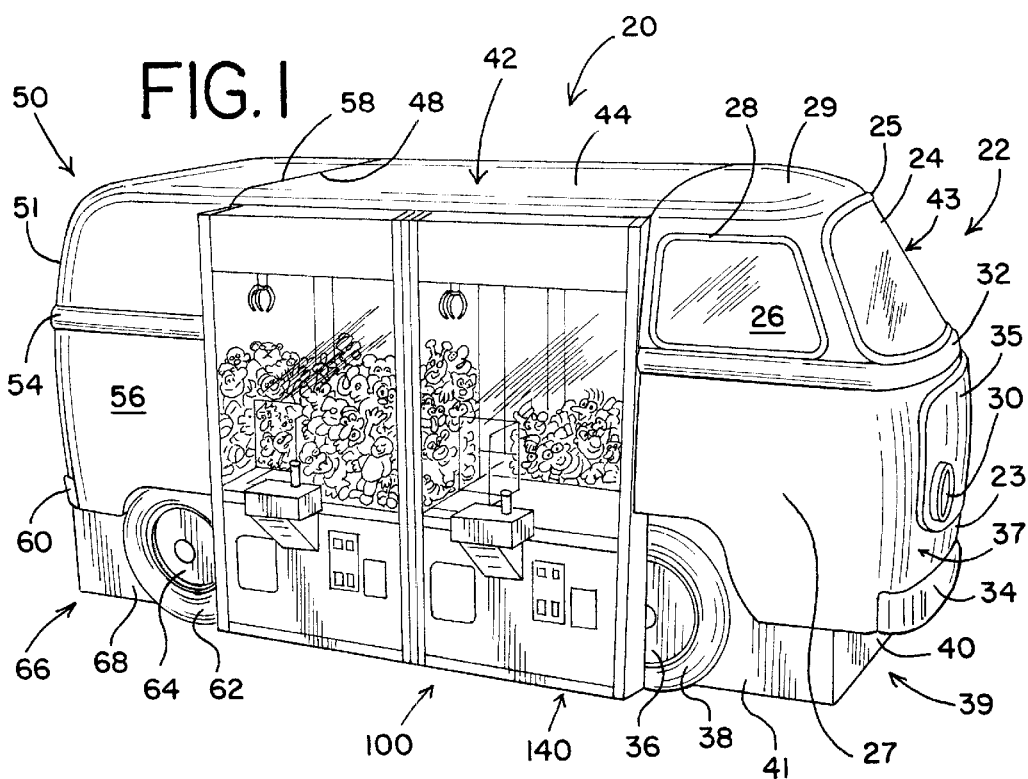
FIG. 1 is a perspective side view of a game assembly constructed in accordance with the principles of the present invention.

An assembly embodying the concept of the present invention is designated generally by reference numeral 20 in the accompanying drawings. As shown in FIGS. 1, 4 and 6, the game assembly 20 generally includes a front end section 22, an intermediate section 42, and a rear end section 50. These three different sections 22, 42 and 50 may be formed separately for assembly in a modular fashion for a cost-effective solution. However, the entire assembly may also be formed as a singular element, if so desired. The material of construction for each part can be from any of a variety of materials usually used to create such objects. Composite materials such as fiberglass, will be most often used.

The front section 22 as illustrated, emulates the front of a vehicle and may include a front, leading portion 23, a pair of side (door) portions 27, a top, roof portion 29, a base portion 39, and a rear panel or wall 31. There are many distinguishing features on the front end section 22 which enable viewers to identify that the front end section 22 resembles a vehicle. Depending on the vehicle of choice, the front end section 22 may take numerous different shapes, sizes and forms. These distinguishing features which characterize the assembly 20 as a vehicle and thereby create curiosity and interest from potential players, drawing them closer to the gaming action.

As best shown in FIGS. 1, 4 and 6, the front, leading portion 23 has a lower element 37 which is substantially vertically oriented, and an upper element 38 which is inclined away from the lower element 37 toward the rear end section 50. Preferably, several distinguishing features which may characterize the front, leading portion 23, including a transparent windshield 24, windshield trim 25, raised portion 35, headlights 30, bumper 34 and a body belt line 32. The front end section 22 also has a pair of laterally opposed side (door) portions 27 illustrated as integrally formed with the front, leading portion 23. The side (door) portion 27 may be characterized by several distinguishing features which may include a transparent side, door window 26, window trim 28, body belt line 32, wheel 36 and tire 38. The top, roof portion 29 joins the upper edges of the front, leading portion 23 and each side, door portion 27 and has a generally contoured shape to suggest integral construction. Due to the constraints of actual physical construction with regard to faithful representation of the desired vehicle a base portion 39 may be visible near the ground. Front 40 and side 41 elements may preferably include a wood structure which supports and balances the front end section 22, and may be visible near the wheel 36 and tire 38 assembly.

As shown in FIG. 5, a rear panel or wall 31 defines the back end of the front end section 22 described above and joins all of the edges thereof together, substantially enclosing what may be described as the passenger compartment of the vehicle. An aperture 33 is formed in the rear panel 31 to permit viewers to view the prizes and gaming action transpiring from outside the front end section. Preferably, the aperture 33 is sized such that the viewers may observe the gaming action from numerous angles without hindrance.

As shown in FIGS. 2, 4, 6 and 7, the rear end section 50 comprises a back portion 51, a pair of substantially identical sides 56, a roof (top) portion 58, a base portion 66, a pair of parallel laterally opposed panels or walls 55, and a front panel or wall 53. Several distinguishing features may characterize the rear end section 50 as a vehicle, including, taillights 52, body belt line 54, wheels 64, tires 62 and a bumper 60. In order to faithfully represent a vehicle, a base portion 66 may be visible near the ground. The base portions 39 and 66 are preferably constructed and designed according to conventional standards to provide the function described above. Rear 70 and side 68 elements may be visible near the wheel 64 and tire 62 assemblies.

Figure 2:
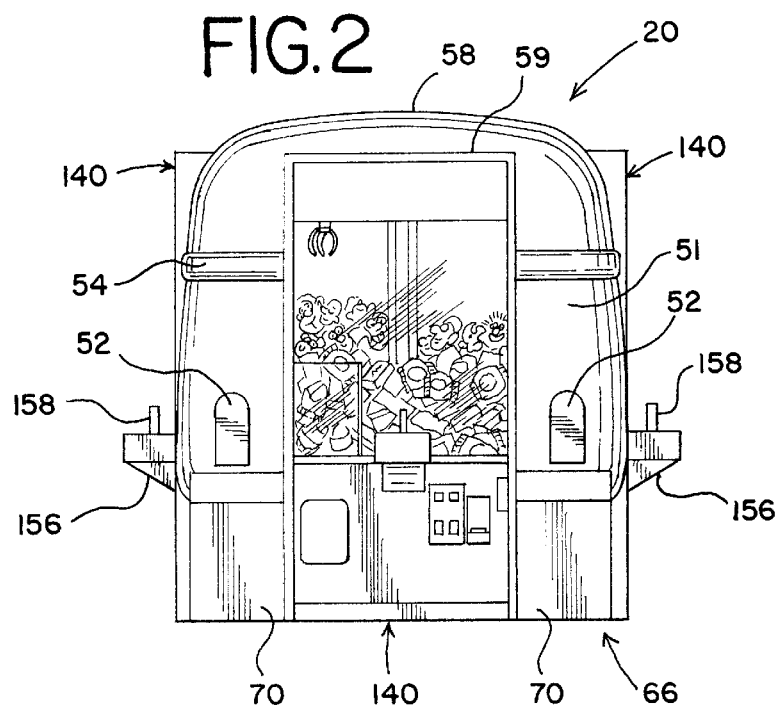
FIG. 2 is rear view of the housing and assembly of FIG. 1.
Figure 7:
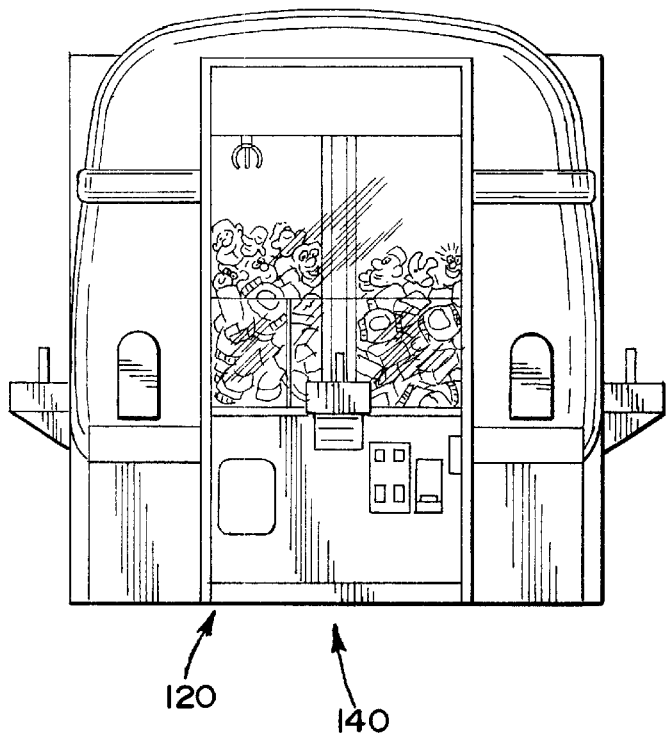
FIG. 7 is an end view of the housing and assembly of FIG. 1 without prizes in the game unit, showing the close proximity of all the game units and the lines-of-sight created thereby.

As best shown in FIGS. 2, 5 and 7, a third receptacle 120 within the rear end section 50, is defined by a pair of generally parallel, laterally opposed panels or walls 55 which extend from the front panel 53 rearwardly to the back portion 51. A bottom element 59 of the roof 58, having a preferably planar configuration, further defines the third receptacle 120. Consequently, the third receptacle 120 may be further characterized as having a rectangular volume.

As shown in FIGS. 1, 3, 4, and 6, the intermediate section 42 has a top portion 44, a bottom portion 46 and a pair of end portions 48. Additionally, it may, as illustrated extend partly over the front end rear end sections 22 and 50 or it may extend completely over the front and rear end sections 22 and 50 of the assembly 20. The first receptacle 100 and second receptacle 110 define rectangular volumes when the intermediate section 42 is joined to the front end section 22 and rear end section 50. The top portion 44 matches the contours of the top, roof portions 29 and 58 so that the overall housing of the assembly 20 preferably appears as a unitary, integral structure which may be easily identified as a vehicle. Since the first receptacle 100 and second receptacle 110 are proximately disposed adjacent one another there are common definition features, namely, the rear panel 31 of the front end section 22 and the front panel 53 of the rear end section 50.

The first, second and third receptacles, 100, 110, and 120, respectively, are defined within the assembly 20 for receiving game units 140. This relationship is best illustrated in FIG. 9 wherein the three receptacles 100, 110 and 120 are illustrated, but wherein the receptacles accommodate five game units, schematically represented by the letters A, B, C, D and E. It will be understood that the number of game units accommodated by the invention is not to be limited to the five such units illustrated, and are only to be constrained by the physical size of the housing. Thus, the assembly 20 becomes a truly variable revenue generation product which may be easily modified to follow the money stream.

Figure 8:
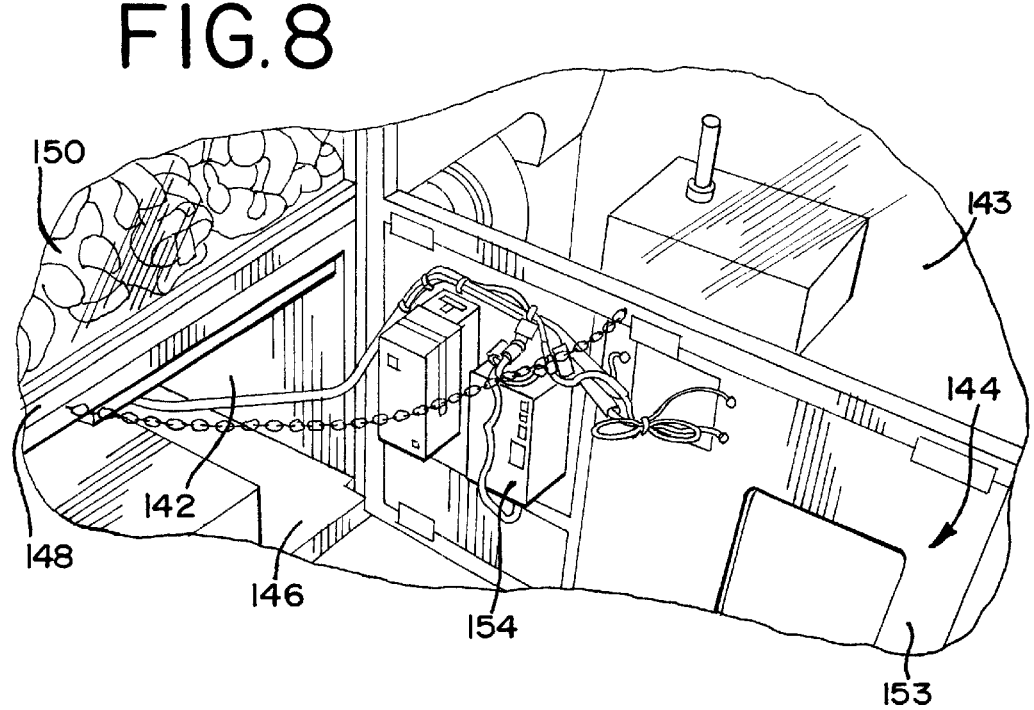
FIG. 8 is an enlarged view of the inside of the game unit door panel of the housing and assembly of FIG. 1.

In the present embodiment of the instant invention, as shown in FIGS. 3 and 8, each game unit 140 occupies a generally rectangular volume and is comprised of three side panels 142, door panel 144, base 146, prize floor 148, retention wall 150, game electronics 160 and game mechanical devices 162. Each side panel 142 has an intermediate transparent portion 143, while the remainder of the panel 142 remains opaque. The door panel 144 is pivotally mounted to an adjacent side panel 142 so that the game unit 140 may be easily serviced, replenished or repaired. An intermediate transparent portion 143 is also illustrated between an upper marquee portion 145 and a lower opaque portion 153. Mounted to the exterior of the door panel opaque portion 153 is a player console 156, preferably having a joystick 158, and dollar bill and coin receiving slots 154 for players to insert money which activates the game. A prize retrieval aperture 152 is also formed in the door panel 144. The prize floor 148, retention wall 150 and transparent side panels 143 define a volume in which the prizes 149 are located. A prize box 151 is further defined between the retention wall 150, door panel 144 and adjacent side panel 142. If the player is successful in the operation of the game, any prize 149 will ultimately be deposited therein. In the present embodiment, the games illustrated are commonly known as a skill crane, which have been in use for many years. A plurality of various prizes are contained within a cabinet having a claw mechanism which is activated by a player outside of the game cabinet. An attempt is made to grasp and retrieve one of the prizes from the cabinets within a predetermined period of time.

In order to achieve the objectives described above and overcome the disadvantages of the prior art, a reflective or mirrored portion 74 is defined on at least one panel 31, 53, or 55 which defines one of the receptacles 100, 110, or 120. Preferably, each panel 31, 53 and 55 has such a reflective portion 74 correspondingly dimensioned to be generally equivalent to the transparent portion 143 of the game unit side panels 142. These reflective surfaces may be used to give the impression that a smaller space is actually larger than in reality. Additionally, reflective portions 74 inside the housing 20, give viewers increased visibility of the prizes and game action, thereby generating more interest and participation in the game units 140.

The present invention additionally overcomes the disadvantages of the prior art since a longitudinal line-of-sight 130 generally along the longitudinal axis L is created by the use and placement of transparent panels or portions. Again, increased visibility permits the game to appeal to more than just the players standing directly in front of the consoles 156. An advantage or unique feature of the present invention allows viewers to position themselves around most of the assembly yet still always have a good view of at least one game. Furthermore, a lateral line-of-sight 132 is available generally normal to the longitudinal axis L. The adjacent, contiguous configuration of the games and plurality of transparent panels not only allows viewers to watch all of the games taking place, but also all the players can watch one another during game play. Consequently, competition may be affected between neighboring or opposing players, across or diagonally situated to results, which may result in increased revenue.

As further illustrated in FIG. 9, each receptacle 100, 110 and 120 and each game unit A, B, C, D and E has a geometrically defined center point C. It will be understood that every additional game unit or receptacle which may be added will also have a center point. The unique configuration of the present assembly is defines a polygonal relationship when an imaginary line I interconnects each receptacle 100, 110 and 120 or connects a game unit 140 from each receptacle 100, 110 and 120. The variety of triangular shapes which may be formed include, isosceles, obtuse, or scalene.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

I claim:

1. A housing for a plurality of arcade games that offers increased visibility of the games to players and viewers alike, comprising:
   a first end section;
   a second end section;
   an intermediate section disposed between and interconnecting said first and said second end sections together, and three sections cooperatively defining at least two different receptacles for receiving at least two different game units; and
   a third receptacle disposed in one of said end sections, wherein direct lines-of-sight greatly increase the visibility of prizes and game action for viewers and players.

2. The housing of claim 1, wherein, said first end section has distinguishing features identifiable as the front portion of a vehicle.

3. The housing of claim 2, wherein, said distinguishing features may be selected from the group consisting of headlights, windshield, windshield trim, bumper, door windows, door window trim, wheels or tires.

4. The housing of claim 1, wherein, said second end portion has distinguishing features identifiable as the rear portion of a vehicle.

5. The housing of claim 4, wherein, said distinguishing features may be selected from the group consisting essentially of taillights, body line, bumper, wheels and tires.

6. The housing of claim 1, wherein, said at least two different receptacles are further defined by a rear panel of said front end section and a front panel of said rear end section.

7. The housing of claim 6, wherein, at least one of said panels has a reflective portion.

8. The housing of claim 6, wherein, at least one of said panels has an aperture which a through longitudinal line-of-sight passes directly through said housing along a longitudinal axis unimpaired.

9. The housing of claim 1, wherein, said third receptacle is disposed in said second end section.

10. The housing of claim 1, wherein, each said receptacle has a geometric centerpoint and an imaginary line drawn through said centerpoints and interconnections said centerpoint defines an imaginary polygon.

11. The housing of claim 10, wherein said imaginary polygon is an imaginary triangle.

12. The housing of claim 11, wherein said imaginary triangle is an isosceles imaginary triangle.

13. A housing for arcade games, comprising:

four distinct faces respectively defining a front face, a rear face and two side faces of the housing;

at least one receptacle defined within three of said four distinct faces by a plurality of interior panels for each receiving at least one arcade game; and at least one of said panels having a reflective portion, wherein, the visibility of prizes and game action for spectators and game operators is greatly increased.

14. The housing of claim 13, wherein, said front face has distinguishing features which may be selected from the group consisting of headlights, insignia, windshield, windshield trim, bumper, door windows, door window trim, wheels or tires.

15. The housing of claim 13, wherein, said panels are opaque.

16. The housing of claim 13, wherein, at least one of said panels has an aperture through which a longitudinal line-of-sight passes directly through the housing along a longitudinal axis unimpaired.

17. An arcade game assembly having multiple arcade games disposed therein, comprising:

a large housing having an exterior configuration resembling a vehicle, and an interior portion including a plurality of separate receptacles, each of said receptacles receiving a portion of at least one arcade game unit therein, said game unit having a plurality of side panels, each of said game unit side panels having a transparent portion;

said housing having at least one transparent panel disposed on said exterior;

said interior portion defined by a plurality of walls with at least one of said walls having an aperture; whereby a longitudinal and a lateral line-of-sight pass completely unimpaired through the assembly, to increase the visibility of prizes contained within said game unit and is increased for viewers and players of said game units.

18. The game assembly of claim 17, wherein, said housing has a modular construction that includes a first end, a second end, and an intermediate portion disposed therebetween and connecting said first end and said second end.

19. The game assembly of claim 18, wherein, said first end section has a front portion disposed on said exterior and a rear well disposed in said interior which has said aperture formed therein.

20. The game assembly of claim 17, wherein, said walls are opaque.

21. The game assembly of claim 17, wherein, at least one of said walls has a reflective portion.

22. The game assembly of claim 21, wherein, said reflective portion dimensionally corresponds with said game unit side panel transparent portion.

23. The game assembly of claim 17, wherein, said game unit has at least one modular arcade game having a pivotally mounted front door which has a control console mounted on an exterior surface, including a joy stick, a prize retrieval portal and payment receiving apertures, and game electronics mounted on an interior thereof.

24. The game assembly of claim 17, wherein, said game unit has a divider wall is disposed therein which defines a prize box and retains prizes in said game unit when a pivotally mounted access door is opened.

25. The game assembly of claim 24, wherein, said divider wall is transparent.

26. A housing for arcade games, comprising:

four distinct faces respectively definining a front face, and two side faces of the housing;

at least one receptacle defined within each of said three distinct faces by a plurality of interior panels for each receiving at least one arcade game;

at least one of said panels having a reflective portion, wherein at least one of said panels has an aperture which a thorough longitudinal line-of-sight passes unimpaired directly thorough said housing along a longitudinal axis, such that visibility of prizes and game action for spectators and game operators is greatly increased.

* * * * *

UNITED STATES PATENT AND TRADEMARK OFFICE
CERTIFICATE OF CORRECTION

| | |
|---|---|
| PATENT NO. | : 6,428,008 B1 |
| APPLICATION NO. | : 09/553878 |
| DATED | : August 6, 2002 |
| INVENTOR(S) | : Craig B. Singer |

It is certified that error appears in the above-identified patent and that said Letters Patent is hereby corrected as shown below:

Column 6, line 58; Claim 1, delete "and" replace with --said--

Signed and Sealed this

Twentieth Day of March, 2007

JON W. DUDAS
*Director of the United States Patent and Trademark Office*